United States Patent Office 3,770,709
Patented Nov. 6, 1973

3,770,709
MONOMER RECOVERY IN POLYMERIZATION PROCESSES
Bruce R. Tegge, Madison, and Barry M. Rosenbaum, Morris Plains, N.J., assignors to Esso Research and Engineering Company
Filed Aug. 14, 1969, Ser. No. 850,029
Int. Cl. C08f 15/04, 15/40
U.S. Cl. 260—80.78                    10 Claims

ABSTRACT OF THE DISCLOSURE

In acordance with certain of its aspects, the novel method of this invention for recovering unreacted higher alpha-olefin from a liquid effluent exiting a polymerization reaction containing catalyst, unreacted ethylene, unreacted higher alpha-olefin, and a cement of ethylene-higher alpha-olefin copolymer in a liquid diluent-solvent wherein said higher alpha-olefin has a boiling point at least 50° C. below the boiling point of said diluent-solvent may comprise:
(a) withdrawing said liquid effluent from said polymerization reaction;
(b) directly flashing said liquid effluent thereby separating, as overhead, diluent-solvent and unreacted ethylene and unreacted higher alpha-olefin and, as bottoms, a concentrated polymer cement containing a minor portion of unreacted higher alpha-olefin;
(c) recovering said unreacted higher alpha-olefin; and
(d) recovering said concentrated polymer cement.

BACKGROUND OF THE INVENTION

Figure 1:
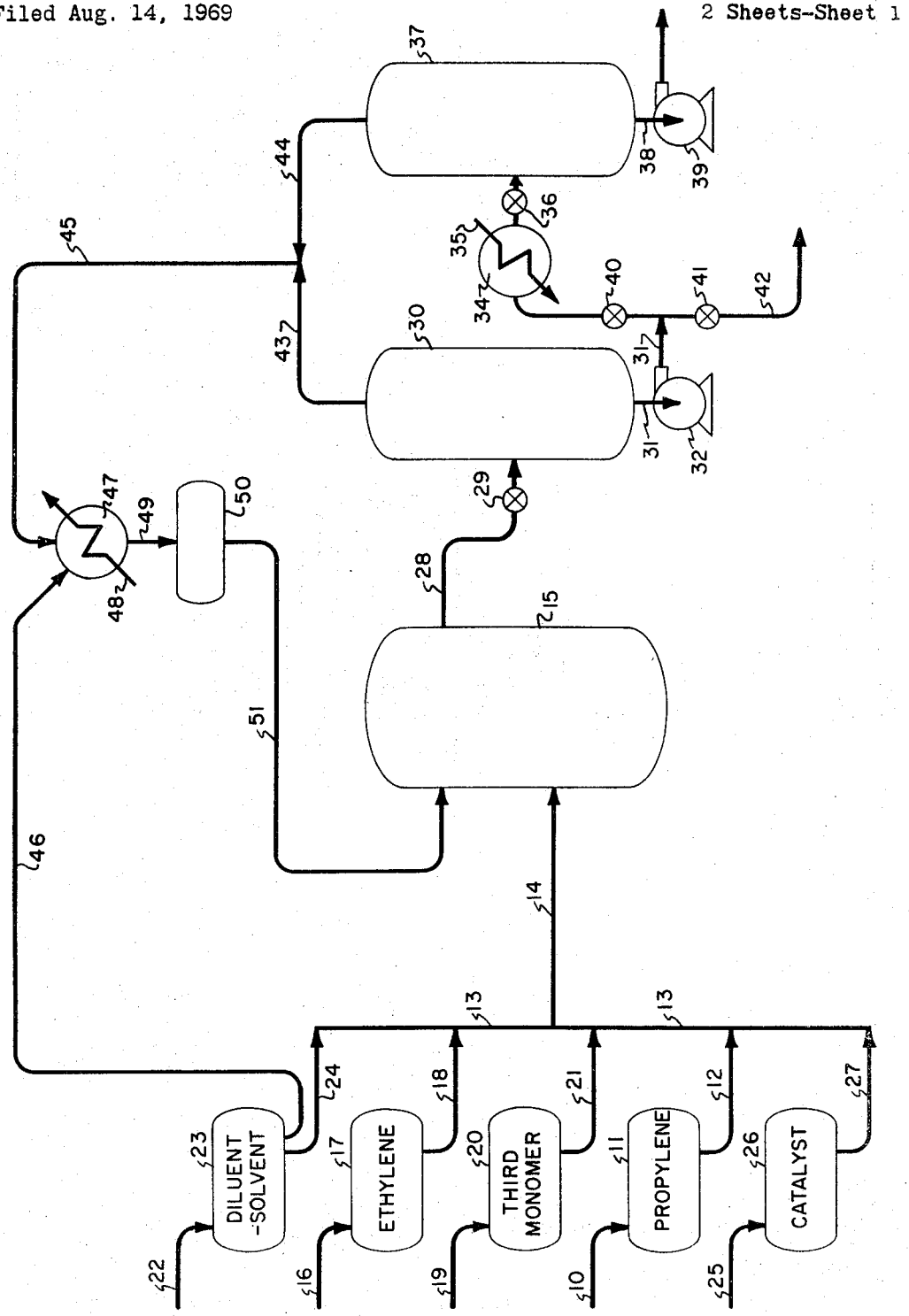

This invention relates to an improved process for purification of reactor effluent from ethylene-propylene copolymerization mixtures. More particularly, it relates to a process for the recovery, from the reactor effluent, of unreacted higher alpha-olefins, e.g. propylene in purity sufficiently high to permit recycle to the reaction mixture.

As is well known to those skilled in the art, ethylene may be copolymerized with higher alpha-olefins, preferably propylene, to prepare copolymers. Typically the higher alpha-olefins may have the general formula $$R—CH=CH_2$$

wherein R is a $C_1$ to $C_8$ alkyl radical; preferably R is a $C_1$ to $C_4$ alkyl radical. The higher alpha-olefin may be linear or branched and, while a single higher alpha-olefin is preferable, mixtures of higher alpha-olefins may be employed. Suitable examples of higher alpha-olefins having the general formula $R—CH=CH_2$ include: propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, 4,4-dimethyl-1hexene, 5,6,6-trimethyl-1-heptene, 5,5-dimethyl-1-octene, and 5-methyl-1-nonene; particularly preferred herein is propylene.

Preferably the copolymer may be a terpolymer wherein the third monomer may be a straight chain or cyclic non-conjugated diolefin having 6-15 carbon atoms such as 5-methylene-2-norbornene; 5-vinyl-2-norbornene; 5(3'-butene)-2-norbornene; 2-methyl-norbornadiene; 2,4-dimethyl-2,7-octadiene; 11-ethyl-1,11-tridecadiene; 3-methallyl cyclopentene; 1,4-hexadiene; 3(2'-methyl-1-propene) cyclopentene; dicyclopentadiene; an indene such as 4,7,8,9-tetrahydroindene; and 1,5-cyclooctadiene.

Typically the monomeric reactants may be present in amounts (per 100 parts of solvent) set forth in the following table:

TABLE I

| Monomer | Broad range | Preferred range | Typical |
|---|---|---|---|
| Ethylene | 0.1–10.0 | 1.0–6.0 | 2.75 |
| Higher alpha-olefin, e.g. propylene | 0.1–20.0 | 1.0–15.0 | 12.5 |
| Diolefin, e.g. 5-ethylidene-2-norbornene | 0.0–2.0 | 0.0–1.0 | 0.22 |

Here, as elsewhere in this specification, all parts are parts by weight unless otherwise specifically stated.

The components of the catalyst composition, e.g. the Ziegler-type catalyst, may include, as catalyst, a compound, preferably a halide of a transition metal (e.g. titanium tetrachloride or vanadium tetrachloride) together with, as cocatalyst, an organometal compound (e.g. an organoaluminum compound such as diethylaluminum chloride). Generally the molar ratio of the cocatalyst (the organometal compound) to the catalyst is in the range of 1:1 to 16:1, preferably 1.5:1 to 7:1. The total amount of catalyst composition employed in the polymerization reaction may vary depending upon the particular components of the catalyst system; but it may generally be in the range of about 0.01 to about 0.1 parts, preferably 0.05 part per 100 parts of diluent solvent.

The diluent-solvent may be a non-reactive reaction medium typically an aromatic hydrocarbon such as toluene, a saturated aliphatic hydrocarbon such as heptane, pentane, and hexane, or a chlorohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen or methane.

Reaction may take place at —10° C. to 70° C. and 0–1000 p.s.i.g. At the conclusion of the reaction, the reactor effluent, as withdrawn, may be found to contain mainly the following components: (a) ethylene-higher alpha-olefin copolymer (typically ethylene-propylene-third monomer terpolymer, when third monomer is employed) this being dissolved in the inert organic diluent-solvent to form a solution containing 3–7, say 5 parts of copolymer per 100 parts of a diluent-solvent, i.e. polymer cement; (b) unreacted higher alpha-olefin and (c) catalyst, some unreacted, but mainly spent catalyst.

In practice, the reactor effluent may be treated for catalyst deactivation, deashing, and steam stripping. During the latter operation, the inert organic diluent and the unreacted monomers are separated by steam distillation from the product polymer. The overhead from this operation may include inert organic diluent and unreacted monomer which may contain, as contaminants, water, alcohol, carbon dioxide, and oxygen. Since the original reaction must be carried out in the absence of these contaminants, it is essential that they be removed. It will be apparent to those skilled in the art that difficult and expensive distillation and/or absorption steps must be carried out to produce recycle propylene and inert diluent which are free of these contaminants; and the problem is particularly significant in the case of propylene as the requisite separations can only be carried out with difficulty at great expense.

The polymer prepared in the polymerization reaction may be typically characterized by certain properties including number average molecular weight and molecular weight distribution. As the reactor effluent is treated during work-up at high temperature, e.g., frequently substantially above about 100° C., it is found that the properties of the product polymer may change. For example, the product elastomeric terpolymer may be found to have lowered tensile strength, undesirably broadened molecular weight distribution, and unpredictable or undesirable changes in properties such as flexibility, brittleness, compression set, hardness, elasticity, viscosity, etc. Minimizing these changes requires the addition of stabilizers, deactivators, quench agents, or other foreign materials. The addition of such foreign agents may raise problems of toxicity, cure rate, low temperature properties, and electrical properties.

It is an object of this invention to provide a novel process for recovering unreacted higher alpha-olefin, typically propylene, from a liquid reactor effluent containing catalyst, unreacted higher alpha-olefin, and a cement of ethylene-alpha-olefin copolymer in liquid-diluent solvent. Other objects will be apparent to those skilled in the art from the following description.

SUMMARY OF THE INVENTION

In accordance with certain of its aspects, the novel method of this invention for recovering unreacted higher alpha-olefin from a liquid effluent exiting a polymerization reaction containing catalyst, unreacted ethylene, unreacted higher alpha-olefin, and a cement of ethylene-higher alpha-olefin copolymer in a liquid diluent-solvent wherein said higher alpha-olefin has a boiling point at least 50° C. below the boiling point of said diluent-solvent may comprise:

(a) withdrawing said liquid effluent from said polymerization reaction;
(b) directly flashing said liquid effluent thereby separating as overhead, diluent-solvent and unreacted ethylene and unreacted higher alpha-olefin and, as bottoms, a concentrated polymer cement containing a minor portion of unreacted higher alpha-olefin;
(c) recovering said unreacted higher alpha-olefin; and
(d) recovering said concentrated polymer cement.

In accordance with certain of its more specific aspects, the novel method of this invention of recovering unreacted higher alpha-olefin from a liquid effluent exiting a polymerization reaction containing catalyst, unreacted higher alpha-olefin, and a cement of ethylene-higher alpha-olefin copolymer in a liquid diluent-solvent wherein said higher alpha-olefin has a boiling point at least 50° C. below the boiling point of said diluent-solvent may comprise:

(a) withdrawing said liquid effluent from said polymerization reaction at reaction pressure and temperature;
(b) directly flashing said reactor effluent to first flash pressure less than the reaction pressure in a first flash operation thereby separating, as first flash overhead, a major portion of the unreacted ethylene and higher alpha-olefin and a minor portion of the diluent-solvent and, as first flash bottoms, a polymer cement containing a major portion of diluent solvent and a minor portion of unreacted ethylene and higher alpha-olefin;
(c) heating said first flash bottoms to second flash inlet temperature above said reaction temperature;
(d) flashing said heated first flash bottoms in a second flash operation to substantially said first flash pressure thereby separating as second flash overhead substantially the remainder of said unreacted ethylene and higher alpha-olefin and, as second flash bottoms, a concentrated polymer cement substantially free of unreacted ethylene and higher alpha-olefin;
(e) recovering said concentrated polymer cement containing polymer of substantially the molecular weight and molecular weight distribution as the polymer in said liquid reactor effluent; and
(f) recovering said first flash overhead and said second flash overhead.

DESCRIPTION OF THE INVENTION

The liquid effluent which may be withdrawn from the polymerization reaction and treated by the process of this invention may be that withdrawn from a reaction wherein ethylene and higher alpha-olefin, preferably propylene, may be reacted to form a copolymer. Preferably the reaction mixture may include a third monomer such as 5-ethylidene-2-norbornene (ENB) and the copolymer may be a terpolymer. The reaction mixture may typically contain, as Ziegler-type catalyst composition, a catalyst compound, preferably a halide, of a transition metal (e.g. titanium tetrachloride or vanadium tetrachloride) together with an organometal cocatalyst compound (e.g. an organoaluminum compound such as diethyl aluminum chloride). There may preferably be present an inert liquid diluent-solvent, typically, a saturated aliphatic hydrocarbon such as propane, pentane, hexane, or heptane, preferably, hexane; and aromatic solvent such as toluene; or a chlorohydrocarbon such as tetrachloroethylene. The preferred diluent may be n-hexane (B.P. 69° C.). The reactor effluent may contain product copolymer, preferably terpolymer, together with unreacted monomers, catalyst composition, and other by-products produced during the reaction.

It is a particular feature of the process of this invention that the novel results may be achieved when the inert diluent-solvent has a boiling point above about 35° C., preferably above about 60° C. and typically at 60° C.–120° C. The higher alpha-olefins which may be employed include those having a boiling point below about 60° C. and most preferably below about 30° C. The preferred results may be achieved when the boiling point of the higher alpha-olefin is more than 50° C., typically 50° C.–150° C. below, and preferably about 100° C. below that of the diluent-solvent.

The reactor effluent may be considered to be a cement, containing typically 3–7, say 5 parts of copolymer in 100 parts of the liquid diluent-solvent which also contains catalyst and unreacted ethylene and unreacted higher alpha-olefin, typically propylene. Reactor effluent, at a temperature of −10° C. to 70° C., say 30° C., and pressure of 0 p.s.i.g.–1000 p.s.i.g., preferably 0–300 p.s.i.g., say 60 p.s.i.g., may contain the following components:

TABLE II

| Component | Typical | Preferred |
|---|---|---|
| Unreacted ethylene | 0.1–0.5 | 0.275 |
| Unreacted higher alpha-olefin | 7.5–12 | 9.85 |
| Cement: | | |
| Copolymer | 3–7 | 5.1 |
| Diluent-solvent | 90–110 | 100 |
| Catalyst composition: | | |
| Catalyst | 0.0017–0.017 | 0.00865 |
| Cocatalyst | 0.0084–0.084 | 0.042 |

In practice of this invention, the reactor effluent may be directly flashed in a first stage flash operation, thereby separating, as overhead, diluent-solvent, unreacted ethylene, and unreacted higher alpha-olefin and, as bottoms, a polymer cement containing a minor portion of unreacted higher alpha-olefin. Flashing may be effected by passing the effluent at a temperature of −10° C. to 70° C., say 30° C. and pressure of 0 p.s.i.g.–300 p.s.i.g., through a pressure release valve into a flash drum wherein the effluent may be flashed to a temperature of 15° C.–25° C., say 20° C. and pressure of 0 p.s.i.g.–10 p.s.i.g., say 2 p.s.i.g.

It is a feature of this invention that flashing may be carried out directly. Passage of the reactor effluent at substantially reactor effluent temperature and pressure directly to the pressure release valve of the flash drum minimizes the possible degradation of product properties which might occur if additives, including stabilizers, were present. Direct flashing without preheat and in the absence of additives, minimizes degradation of polymer product and the tendency to fouling on heated surfaces. Practice of the novel process, including passage of reactor effluent directly to the flash drum (through a pressure release valve), permits recovering of maximum quality product with minimum modification in properties. Maintenance of the reactor effluent at substantially reactor temperature and the fact that this stream is not heated in the presence of unreacted ethylene and higher alpha-olefins minimizes further reaction to produce undesired changes in product quality.

It is a feature of this invention that the first stage flash pressure is such that the first stage flash overhead contains substantially all of the unreacted ethylene and a major portion of the unreacted higher alpha-olefin. The preferred relationship between the boiling point of the higher alpha-olefin and the diluent-solvent permits attainment of overhead containing only a minor portion of the diluent-solvent and simultaneously recovery of a bottoms polymer cement containing minimum amounts of unreacted ethylene and higher alpha-olefin. When flashing is carried out according to this embodiment, the first stage flash overhead may have a composition as set forth in Table III.

TABLE III

| Component | Typical | Preferred |
|---|---|---|
| Unreacted ethylene | 0.09–0.45 | 0.24 |
| Unreacted higher alpha-olefin | 4.5–7 | 5.7 |
| Diluent-solvent | 2.2–2.8 | 2.5 |

This overhead at less than about 50° C., typically, say, 20° C., and 0–10 p.s.i.g., say 2 p.s.i.g., may be passed to a condenser wherein it may be cooled, as by refrigeration, to effect condensation. Prior to admission to the condenser, the first stage flash overhead vapors may be contacted with at least a portion of the diluent-solvent to be admitted to the reactor to effect condensation of the first stage flash overhead vapor. It is a feature of this invention that addition of diluent-solvent to the uncondensed vapors may raise the bubble point of the mixture to a point at which condensation may readily be effected; and the composition of the mixture is such that it may readily be recirculated to the reactor as herein set forth. Typically, the uncondensed vapors may have a bubble point of —70° C. to —30° C., say —50° C., and there may be added thereto 70 to 100, say 90, parts of diluent-solvent having a boiling point of 50° C. to 100° C., say 69° C. Addition of diluent-solvent at 30° C. —50° C., say 37° C., may raise the bubble point of the mixture to 0° C.–15° C., say 10° C. at 0 p.s.i.g.–10 p.s.i.g., say 2 p.s.i.g. and effect condensation. The so-condensed liquid may have the following composition:

TABLE IV

| Component | Typical | Preferred |
|---|---|---|
| Unreacted ethylene | 0.09–0.45 | 0.24 |
| Unreacted higher alpha-olefin | 4.5–7 | 5.7 |
| Diluent-solvent | 72.2–102.8 | 92.5 |

This condensate at 0° C.–15° C., say 10° C., may be passed to the reactor wherein polymerization occurs.

The first stage flash bottoms may, typically, be a polymer cement containing a minor portion of unreacted higher alpha-olefin having the following composition:

TABLE V

| Component | Typical | Preferred |
|---|---|---|
| Unreacted ethylene | 0.01–0.05 | 0.035 |
| Unreacted higher alpha-olefin | 3–5 | 4.15 |
| Cement | 90.5–114.5 | 102.6 |
| Copolymer | 3–7 | 5.1 |
| Diluent-solvent | 87.5–107.5 | 97.5 |

These first stage bottoms may preferably be further treated to recover the remaining portion of unreacted higher alpha-olefin together with some diluent-solvent, thereby permitting attainment of more purified and concentrated polymer cement with absolute minimum loss of product properties. Bottoms at temperature of 15° C.–25° C., say 20° C., and pressure of 0 p.s.i.g.–10 p.s.i.g., say 2 p.s.i.g., may be further flashed in a second stage by superheating in liquid phase to 50° C.–80° C., say 70° C. and a pressure of 50 p.s.i.g.–150 p.s.i.g., say 100 p.s.i.g. The so-heated bottoms may be passed through a pressure release valve into a second stage flash drum at a temperature of 30° C.–60° C., say 50° C., and a pressure of 0 p.s.i.g.–10 p.s.i.g., say 2 p.s.i.g.

Since second stage flashing occurs in the presence of little or no unreacted ethylene, it is possible to operate under conditions which yield minimum degradation in product quality. It is a feature of this invention that use of the technique disclosed herein permits effective recovery of products and by-products under conditions which permit use of temperatures below about 80° C., and, typically, 50° C.–80° C. The removal of the major portion of ethylene and unreacted higher alpha-olefin in the first flash operation permits operation of the second stage flash operation, with removal of substantially the remainder of the ethylene and unreacted higher alpha-olefin, at temperature well below 80° C., and at preferably the same low pressure prevailing in the first flash operation. Above this preferred maximum, a substantial amount of further reaction may occur unless an undesirable additive (e.g., a quench agent) is present.

The second stage flash overhead vapors may have a composition as set forth in Table VI.

TABLE VI

| Component | Typical | Preferred |
|---|---|---|
| Unreacted ethylene | 0.01–0.05 | 0.035 |
| Unreacted higher alpha-olefin | 2.75–4.0 | 3.5 |
| Diluent-solvent | 7–9 | 7.5 |

Preferably, the second stage flash overhead vapors may be combined with the first stage flash overhead vapors (Table III), and the combined vapors condensed as hereinbefore disclosed. The condensate may be recycled to the polymerization reactor.

Bottoms from the second stage flash operation may have the following composition:

TABLE VII

| Component | Typical | Preferred |
|---|---|---|
| Unreacted higher alpha-olefin | 0.25–1.0 | 0.6 |
| Diluent-solvent | 80–100 | 90 |
| Copolymer | 3–7 | 5.1 |

It is a feature of this invention that the novel product polymer of this invention retains the desired properties it possesses as it leaves the reactor. A comparison of the product of this novel process with products of typical control processes may demonstrate that the properties of the control product are modified considerably by the work-up procedure unless a heavy catalyst quench is added prior to work-up; in that case however the product may be inherently modified since the heavy catalyst quench agent remains in the finished polymer. The foreign substances used as heavy quench agents may change product cure rate, low temperature properties, electrical properties, and may raise toxicity problems. In control processes which do not use a heavy quench agent and do not conform to the work-up conditions in the instant invention, the product properties may be modified considerably as outlined hereafter. For example, in comparative examples, ethylene, propylene, and ethylidene-2-norbornene may be reacted at 30° C. and 60 p.s.i.g. in the presence of vanadium tetrachloride and diethyl aluminum chloride (in hexane) to yield a product. Reactor effluent may typically have the following properties and composition:

TABLE VIII

| Component: | |
|---|---|
| Unreacted ethylene, parts | 0.275 |
| Unreacted propylene, parts | 9.85 |
| Cement: | |
| Copolymer, parts | 5.1 |
| Diluent-solvent, parts | 100 |
| Mooney viscosity (ML–8 min. @260° F.) | 60 |
| Molecular weight (number average) | 80,000 |
| Inherent viscosity | 3.5 |
| Tensile strength p.s.i.[1] | 2,000 |
| 300% modulus p.s.i.[1] | 700 |
| Shore A hardness [1] | 50 |
| Garvey extrusion in./min.[1] | 60 |

[1] Properties measured on a cured product prepared in standard manner by mixing 100 parts of polymer for twenty minutes at 320° F. with 70 parts of FEF carbon black and 30 parts of SRF carbon black, 120 parts of Flexon brand of naphthenic hydrocarbon oil, 1 part of stearic acid, 5 parts of zinc oxide, 0.5 part of Tuads brand of tetramethyl thiuram disulfide, 0.5 part of Tellurac brand of tellurium diethyl dithiocarbamate (80% purity), 0.5 part of Tetrone A brand of dipentamethylene thiuram tetrasulfide, 0.5 part of Captax brand of mercaptobenzothiazole, and 0.85 part of sulfur.

The control process may include the addition to the reactor effluent of 0.05 part of ethylene glycol as a heavy quenching agent or quenching may be omitted and the flashing carried out at temperature conditions more severe than the conditions of this invention. In such control processes, although the higher alpha-olefin may be recovered, the product properties may undesirably change during the flash operation. Typical flash conditions of the control process may require heating the reactor effluent to temperatures above 100° C. and flash temperature in excess of 80° C. Flash temperature in the first stage flash zone may be particularly important since concentrations of unreacted ethylene and higher alpha-olefin may be important; and temperatures above about 50° C. in the control process will cause change in product properties. The experimental process may include the one-step direct flashing in accordance with practice of this invention. Subsequent work-up of the polymer cement obtained in the flashing operation may be by the same procedure as in the control process.

The product polymer on measurement may be found to have the following properties:

TABLE IX

| Property | Control | Experimental |
|---|---|---|
| Mooney viscosity (ML–8 min. at 260° F.) | 70 | 60 |
| Molecular weight (number average) | 95,000 | 80,000 |
| Inherent viscosity | 4.0 | 3.5 |
| Tensile, p.s.i.[1] | 1,600 | 2,000 |
| 300% modulus, p.s.i.[1] | 550 | 700 |
| Shore A hardness [1] | 45 | 50 |
| Garvey extrusion, in./min.[1] | 50 | 60 |

[1] See footnote, Table VIII.

From the above comparative example, it will be apparent that product properties may change considerably during flashing unless flashing is carried out in accordance with the practice of this invention. Tensile strength may decrease by e.g. 20% and the modulus and hardness may significantly decrease. Thus the novel process does in fact permit attainment of high product quality.

Practice of the novel process of this invention may, in one embodiment, be carried out according to the flow sheet set forth in FIG. 1 of the drawing. In FIG. 1, higher alpha-olefin, e.g., propylene, feed may be admitted through line 10 to propylene storage vessel 11 from which it may pass through lines 12, 13 and 14 to reaction vessel 15. Ethylene feed may be admitted through line 16 to ethylene storage vessel 17 from whcih it may pass through lines 18, 13 and 14 to reaction vessel 15. Third monomer may be admitted through line 19 to third monomer storage vessel 20 from which it may pass through lines 21, 13 and 14 to reaction vessel 15. Diluent-solvent feed may be admitted through line 22 to diluent-solvent storage vessel 23 from which it may pass through lines 24, 13 and 14 to reaction vessel 15. Catalyst may be admitted through line 25 to catalyst storage vessel 26 from which it may pass through lines 27, 13 and 14 to reaction vessel 15. Although these feeds to reaction vessel 15 are schematically shown as separate, two or more may be combined into two or more charge streams to reaction vessel 15.

Reaction vessel 15 may be a vessel adapted to be operated at pressure and temperature of reaction. It may typically contain an agitator and heating and/or cooling coils. Reactor effluent may exit reaction vessel 15 through line 28, be passed through throttle valve 29 directly into first stage flash drum 30.

Flashed bottoms may be withdrawn from first stage flash drum 30 through line 31 and pump 32. In certain aspects of this invention, valve 40 (normally open) may be closed and valve 41 open, thus permitting flashed bottoms from drum 30 to be withdrawn through line 42. Preferably, the flashed bottoms may pass through line 33 to heat exchanger 34 wherein it is maintained in liquid phase without vaporization as it is preferably superheated to second stage flash temperature and pressure by steam in line 35. The superheated flashed bottoms may then be further passed through line 33 and pressure release or throttle valve 36 into second stage flash drum 37.

Polymer cement bottoms may be removed from second stage flash drum 37 through line 38 and pump 39, and passed through line 38 to storage prior to further treating.

Overhead from first stage flash drum 30 may be removed through line 43; and overhead from second stage flash drum 37 may be removed through line 44. The overhead may be combined in line 45. Combined overhead may be condensed to desired temperature by contact with diluent-solvent from line 46 and passage through heat exchanger 47 cooled by cooling water in line 48. The condensed gas may be passed from heat exchanger 47 through line 49 to condensate vessel 50. Condensate in vessel 50 may be recycled through line 51 to reaction vessel 15 without further purification.

Figure 2:
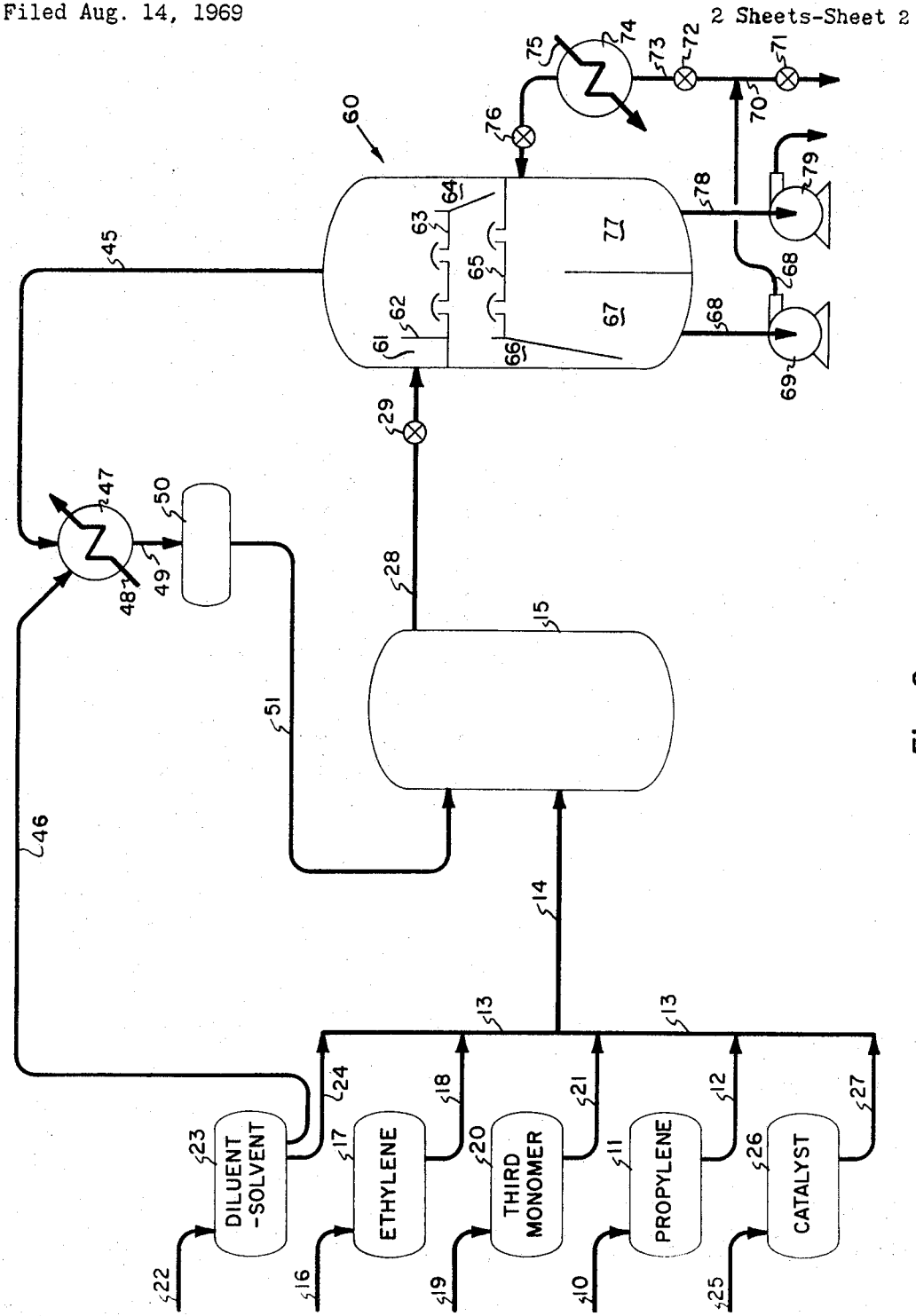

Practice of the novel process of this invention may, in accordance with a second embodiment, be carried out according to the flow sheet set forth in FIG. 2 of the drawing. In FIG. 2, the process is carried out in a manner similar to that of FIG. 1, up to the point of treatment of the reactor effluent.

In the embodiment of FIG. 2, the reactor effluent may be withdrawn from reaction vessel 15 through line 28 and be passed through throttle valve 29 into combined flash drum 60. In one embodiment, drum 60 contains first flash chamber 61 including weir 62, over which liquid may pass across contact deck 63, through downcomer 64, across contact deck 65, and down downcomer 66 to first flash bottoms collection zone 67.

Flashed bottoms may be withdrawn from zone 67 through line 68 and pump 69. At least a portion of pumped bottoms in line 68 may be withdrawn through line 70 when valve 71 is open and valve 72 in line 73 is closed. Preferably, however, valve 71 may be closed and valve 72 open. Flashed bottoms in line 73 may be passed through heat exchanger 74 wherein it is maintained in liquid phase without vaporization, as it is preferably superheated to second stage flash temperature and pressure by steam in line 75. The superheated flashed bottoms may then be further passed through line 73 and pressure release or throttle valve 76 into second stage flash zone 77.

It is a feature of the embodiment of FIG. 2, that the vapors, containing diluent-solvent, may pass upwardly through the contact section, including contact decks 63 and 65 and thereby assist in stripping out ethylene and higher alpha-olefin from the descending liquid. Presence of the additional diluent-solvent in the contact section may minimize fouling.

Polymer cement bottoms may be removed from zone 77 through line 78 and pump 79 and passed through line 78 to storage prior to further treating.

Overhead from drum 60 may be removed through line 45 and condensed to desired temperature by contact with diluent-solvent from line 46 and passage through heat exchanger 47 cooled by cooling water in line 48. The condensed gas may be passed from heat exchanger 47 through line 49 to condensate vessel 50. Condensate in vessel 50 may be recycled through line 51 to reaction vessel 15 without further purification.

Practice of the novel process of this invention may be apparent from the following illustrative example of a preferred embodiment wherein, as elsewhere, all parts are parts by weight, unless otherwise specified.

DESCRIPTION OF PREFERRED EMBODIMENT

Example 1

In accordance with a preferred embodiment of this invention, the following may be charged to a reaction vessel per hour.

TABLE X

| Component: | Parts |
|---|---|
| Ethylene | 2.75 |
| Propylene | 12.5 |
| 5-ethylidene-2-norbornene | 0.22 |
| Hexane (diluent-solvent) | 100 |
| Catalyst (total) | 0.05 |
| Vanadium tetrachloride | 0.008 |
| Diethyl aluminum chloride | 0.042 |

Reaction may be carried out at 30° C. and 60 p.s.i.g. for 15 minutes to produce a polymer product containing the following:

TABLE XI

| Component: | Parts |
|---|---|
| Unreacted ethylene | 0.275 |
| Unreacted propylene | 9.85 |
| Catalyst (total) | 0.05 |
| Cement (total) | 115 |
| Polymer | 5.1 |
| Diluent-solvent-hexane | 100 |

The reactor effluent at 30° C. and 60 p.s.i.g. may be passed according to the flowsheet of FIG. 1 through a throttle valve into the first stage flash drum at 20° C., and 2 p.s.i.g. The overhead may contain 0.24 part of ethylene, 5.7 parts of propylene and 2.5 parts of hexane.

Bottoms from the first stage flashing drum may then be heated to 70° C. and 100 p.s.i.g. and passed through a throttle valve into the second stage cement flashing drum at 50° C. and 2 p.s.i.g. The overhead may be 0.035 part of ethylene, 3.5 parts of propylene and 7.5 parts of hexane. The second stage overhead and the first stage overhead may be combined. Addition to the combined overhead of 90 parts of hexane diluent-solvent at 37° C., lowers the bubble point of the resultant mixture to effect condensation at 10° C. and 2 p.s.i.g. of a liquid which may be recycled to the reaction vessel.

The second stage cement bottoms containing 0.6 part of propylene, 90 parts hexane, and 5.1 parts polymer may be recovered and passed to other steps including blending, deashing, and extending to yield as product an ethylene-propylene-5-ethylidene-2-norbornene terpolymer product. Final product properties will be the same as the properties of the reactor effluent and such critical quality measures as Mooney Viscosity, molecular weight, molecular weight distribution, inherent viscosity, tensile, hardness, extrusion, and elasticity will be unchanged through practice of this invention.

It will be apparent to those skilled in the art that this novel process permits attainment of product polymer characterized by freedom from undesirable components and by substantially the same properties as are achieved at the reactor outlet. The heat history of the product polymer is maintained under desired control and the absence of quench permits attainment of superior product.

The novel products of this invention may be used in a wide variety of end uses. Typically, they may find use in molded, formed, or coated products including sponges, tires and inner tubes, footwear, cable coatings, hoses and tubings, belts, etc.

Although this invention has been illustrated by reference to specific embodiments, it will be apparent to those skilled in the art that various changes and modifications may be made which clearly fall within the scope of this invention.

What is claimed is:

1. The method of separating unreacted higher alpha olefin from a liquid effluent exiting a polymerization reaction involving the use of a Ziegler-type catalyst and containing said catalyst, unreacted ethylene, unreacted higher alpha olefin and cement of ethylene-higher alpha olefin copolymer in a hydrocarbon liquid diluent-solvent wherein said unreacted higher alpha olefin has a boiling point of at least 50° C. below the boiling point of said diluent-solvent which comprises:

(a) withdrawing said liquid from said polymerization reaction at reaction pressure and temperature;
   (b) directly flashing said effluent at a pressure less than the reaction pressure, in a first flash operation to separate a first flash overhead of substantially all of the unreacted ethylene, a major portion of the unreacted higher alpha olefin and a minor portion of the diluent-solvent, and, as a first flash bottoms, a copolymer hydrocarbon cement containing copolymer, a major portion of the diluent-solvent, and any remainder of the unreacted ethylene and the remainder of the unreacted higher alpha olefin;
   (c) heating said first flash bottoms to a second flash inlet temperature above said reaction temperature and pressure;
   (d) flashing said heated first flash bottoms, in a second flash operation, to a pressure substantially that of the said first flash pressure, separating, as a second flash overhead, substantially all of any remaining unreacted ethylene and substantially all of the remaining unreacted higher alpha olefin together with a minor portion of the diluent-solvent and, as a second flash bottoms, a concentrated copolymer hydrocarbon cement containing said copolymer in said hydrocarbon liquid diluent-solvent, substantially free of unreacted ethylene and unreacted higher alpha olefin; and
   (e) recovering said concentrated copolymer hydrocarbon cement containing copolymer of substantially the molecular weight and molecular weight distribution as the copolymer formed in said polymerization reaction.

2. The method as claimed in claim 1 wherein the overhead from either or both of the flashing operations is cooled and condensed with additional amounts of liquid diluent-solvent and introduced into the polymerization reaction.

3. The method as in claim 2 wherein the overhead of the first flashing operation and the overhead of the second flashing operation are combined, cooled, admixed with additional amounts of liquid diluent-solvent and the combined condensate introduced into the polymerization reaction.

4. The method as in claim 1 wherein the higher alpha olefin is propylene.

5. The method as in claim 2 wherein the higher alpha olefin is propylene.

6. The method as in claim 1 wherein the diluent-solvent is hexane.

7. The method as in claim 1 wherein the second flashing is carried out at a temperature between about 50 and about 80° C.

8. The method as in claim 1 wherein a nonconjugated diolefin is employed as a third monomer and a concentrated terpolymer hydrocarbon cement containing terpolymer of substantially the molecular weight and molecular weight distribution as the terpolymer formed in said polymerization reaction.

9. The method as in claim 8 wherein the higher alpha olefin is propylene.

10. The method as in claim 9 wherein the diluent-solvent is hexane, the second flashing temperature is between about 50 and about 80° C. and the pressure in both flashing operations is between about 0 and about 10 p.s.i.g.

References Cited
UNITED STATES PATENTS

| | | | |
|---|---|---|---|
| 3,280,091 | 10/1966 | Dance | 260—94.9 X |
| 3,130,187 | 4/1964 | Tolin et al. | 260—94.9 |
| 3,412,779 | 11/1968 | Wagner et al. | 260—94.9 X |

JOSEPH L. SCHOFER, Primary Examiner

W. F. HAMROCK, Assistant Examiner

U.S. Cl. X.R.

260—88.2 S, 94.9 F